United States Patent
Staal et al.

(10) Patent No.: US 11,260,784 B2
(45) Date of Patent: Mar. 1, 2022

(54) ACTIVE VEHICLE FOOTREST

(71) Applicant: HONDA MOTOR CO., LTD., Tokyo (JP)

(72) Inventors: Matthew B. Staal, Torrance, CA (US); Nelson Vanwagoner, Santa Monica, CA (US); Jonathan G. Moss, Los Angeles, CA (US); Rudolph Carruolo, Midway City, CA (US); Bradford D. Kent, San Pedro, CA (US); Bharat Naran, Huntington Beach, CA (US)

(73) Assignee: HONDA MOTOR CO., LTD., Tokyo (JP)

( * ) Notice: Subject to any disclaimer, the term of this patent is extended or adjusted under 35 U.S.C. 154(b) by 257 days.

(21) Appl. No.: 16/370,531

(22) Filed: Mar. 29, 2019

(65) Prior Publication Data

US 2020/0307434 A1 Oct. 1, 2020

(51) Int. Cl.
*B60N 3/06* (2006.01)
*B62J 1/28* (2006.01)
*B62J 1/12* (2006.01)

(52) U.S. Cl.
CPC ............... *B60N 3/063* (2013.01); *B62J 1/12* (2013.01); *B62J 1/28* (2013.01)

(58) Field of Classification Search
CPC ..... B60N 3/063; B62J 1/12; B62J 1/28; B62J 25/00; B62J 25/04
USPC ............................. 296/75; 297/68; 280/291
See application file for complete search history.

(56) References Cited

U.S. PATENT DOCUMENTS

| | | | |
|---|---|---|---|
| 3,350,065 | A | 10/1967 | Mankey |
| 4,858,481 | A | 8/1989 | Abraham |
| 5,557,154 | A | 9/1996 | Erhart |
| 8,249,773 | B2 | 8/2012 | Kawada et al. |
| 2011/0049945 | A1 | 3/2011 | Mouri et al. |
| 2015/0151804 | A1 | 6/2015 | Camp et al. |
| 2015/0190292 | A1 | 7/2015 | Robins |
| 2017/0361893 | A1* | 12/2017 | Lee ................. B62K 11/02 |
| 2018/0110664 | A1* | 4/2018 | Borisoff ............ A61G 5/14 |
| 2019/0275920 | A1* | 9/2019 | Bae ................. B60N 2/938 |

FOREIGN PATENT DOCUMENTS

| | | |
|---|---|---|
| CN | 107802424 A | 3/2018 |
| EP | 2062567 A1 | 5/2009 |
| EP | 2833850 | 2/2015 |
| GB | 2414172 A | 11/2005 |
| JP | 5065778 B2 | 11/2012 |

* cited by examiner

*Primary Examiner* — Joseph D. Pape
(74) *Attorney, Agent, or Firm* — Arent Fox LLP

(57) ABSTRACT

A vehicle and passenger carrying apparatus usable with a vehicle, wherein the passenger carrying portion includes a seating surface and a moveable footrest below the seating surface. The footrest is moveable from an ingress/egress position to a transport position that is closer to the seating surface than the ingress/egress position. The passenger carrying portion further includes a footrest movement mechanism, wherein the footrest movement mechanism controls movement of the moveable footrest between the ingress/egress position the transport position.

19 Claims, 11 Drawing Sheets

ACTIVE VEHICLE FOOTREST

FIELD OF THE INVENTION

Aspects of the present disclosure relate a vehicle and passenger carrying apparatus usable with the vehicle. More specifically, aspects relate to a vehicle passenger carrying portion with a movable footrest and ingress/egress area.

BACKGROUND

As vehicle congestion and associated pollution increases, especially in urban areas, the need exists for alternative transportation. Bicycles are a well know alternative for convenient and efficient transportation. However, the need exists to transport cargo or people who may be otherwise unable to utilize a bicycle as a method of transportation. Light transport vehicles, such as bicycle trailers, are often utilized to transport cargo or children. However, light transport vehicles rely on a bicycle to tow the trailer. Bicycle trailers have several disadvantages, including the need for an attachment mechanism for connection to a bicycle. Further, a bicycle connected to a trailer may be cumbersome and difficult to handle or maneuver in certain situations. Thus, bicycle trailers may be unstable and cumbersome for frequent transport of cargo or children. In addition, bicycle trailers are not practical for transport of adults or for hauling heavier cargo.

SUMMARY

This summary is provided to introduce a selection of concepts in a simplified form that are further described below in the DETAILED DESCRIPTION. This summary is not intended to identify key features of the claimed subject matter, nor is it intended to be used as an aid in determining the scope of the claimed subject matter.

In accordance with one aspect of the disclosure, a vehicle and passenger carrying apparatus usable with a vehicle is disclosed. Among other features, the passenger carrying portion includes a seating surface and a moveable footrest below the seating surface. The footrest is moveable from an ingress/egress position to a transport position that is closer to the seating surface than the ingress/egress position. The passenger carrying portion further includes a footrest movement mechanism, wherein the footrest movement mechanism controls movement of the moveable footrest between the ingress/egress position the transport position.

Additional advantages and novel features of these aspects will be set forth in part in the description that follows, and in part will become more apparent to those skilled in the art upon examination of the following or upon learning by practice of the disclosure.

BRIEF DESCRIPTION OF THE DRAWINGS

The novel features believed to be characteristic of aspects of the disclosure are set forth in the appended claims. In the description that follows, like parts are marked throughout the specification and drawings with the same numerals, respectively. The drawing figures are not necessarily drawn to scale and certain figures may be shown in exaggerated or generalized form in the interest of clarity and conciseness. The disclosure itself, however, as well as a preferred mode of use, further objects and advantages thereof, will be best understood by reference to the following detailed description of illustrative aspects of the disclosure when read in conjunction with the accompanying drawings, wherein:

DETAILED DESCRIPTION

The disclosure relates to various aspects of one or more vehicles, vehicle passenger carrying portions and/or a movable footrest areas for improving ease of ingress/egress of the passenger carrying portion. A vehicle, which may for example be a pedal operated vehicle, may include a passenger carrying portion with one or more seat(s) and footrest(s). A passenger may sit in the one or more seats of the passenger carrying portion and place his or her feet on the footrest while the vehicle and vehicle operator transport the passenger, for example. In certain situations, it may be difficult for a passenger of a vehicle to step up onto the footrest when seating themselves on a seat of the passenger carrying portion. One example solution in accordance with aspects of the present disclosure to improve ingress/egress of passengers into the passenger carrying portion is to decrease the distance between the footrest and the ground surface on which the vehicle travels. However, with this solution, decreasing the distance between the footrest and the ground surface may decrease ground-clearance of the vehicle, for example. In another example aspect of the disclosure, a moveable footrest is disclosed for improved ingress/egress while maintaining acceptable ground-clearance of the vehicle.

An example moveable footrest in accordance with one aspect of the disclosure may be moveable from an ingress/egress position to a transport position. For example, when the vehicle is in an ingress-use position, the disclosed footrest may be moveable in a downward direction and selectively held in an ingress/egress position. Once a passenger is seated in the passenger carrying portion, the footrest may be moveable in an upward position to a transport position. Further detail of various examples of the footrest and its operation, passenger carrying portion, and vehicle usable with the passenger carrying portion are described herein.

Figure 1:
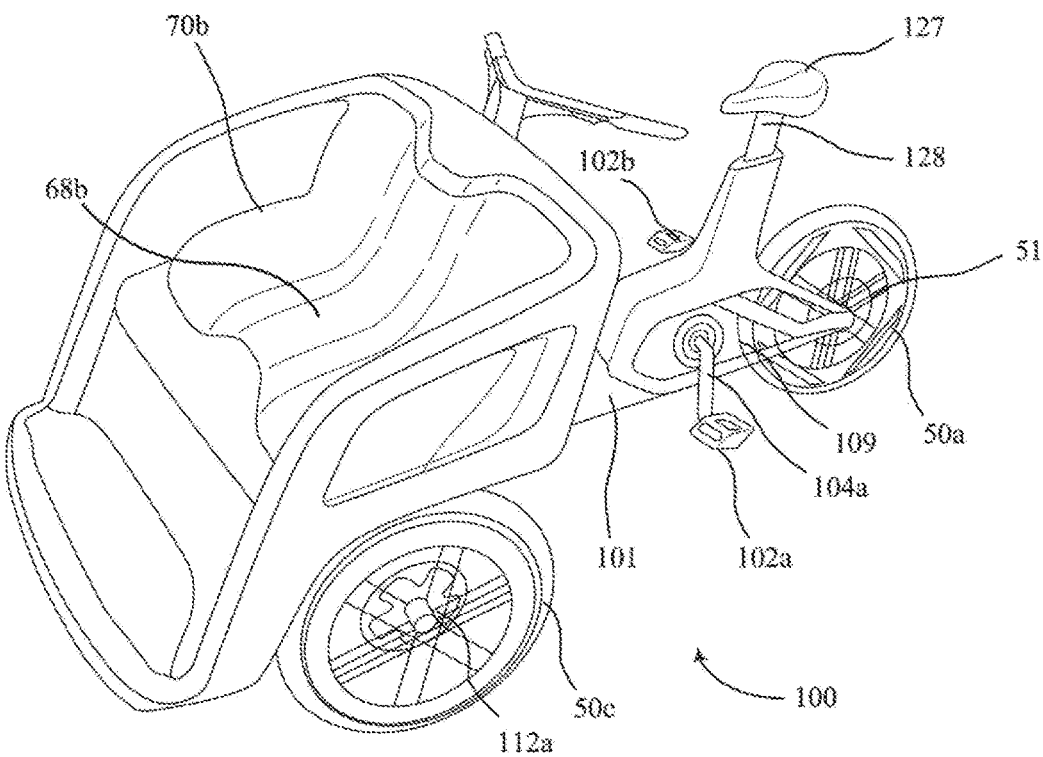
FIG. 1 is a perspective view of an example vehicle with an interchangeable passenger carrying portion usable with an adjustable footrest in accordance with aspects of the disclosure.
Figure 2:
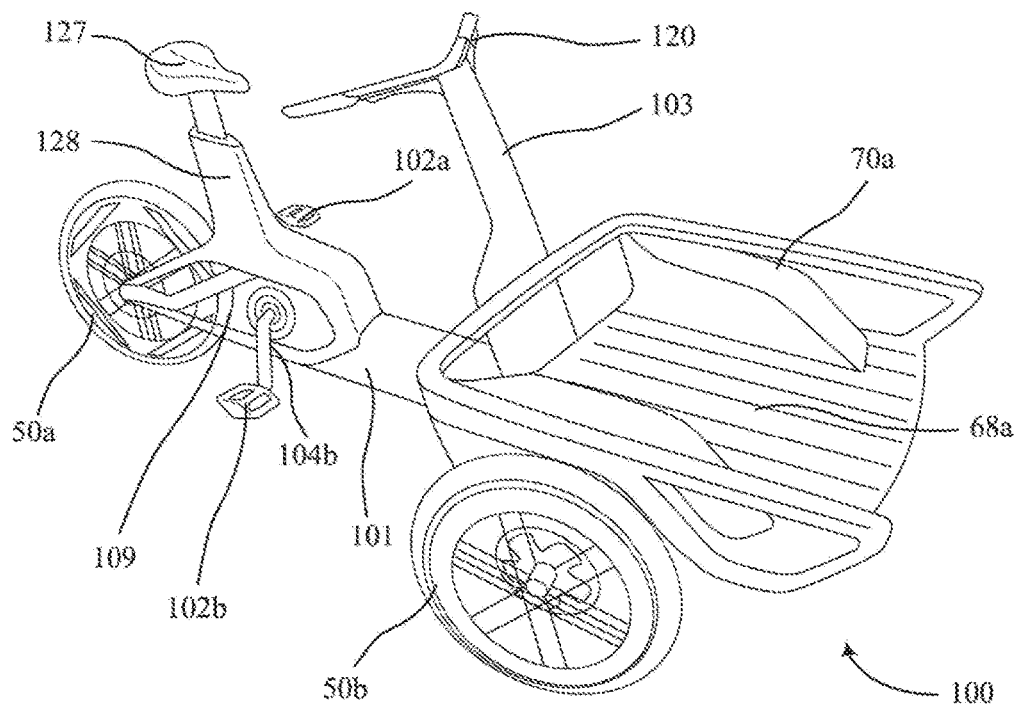
FIG. 2 is a perspective view of the vehicle of FIG. 1 with an interchangeable cargo carrying portion.
Figure 3:
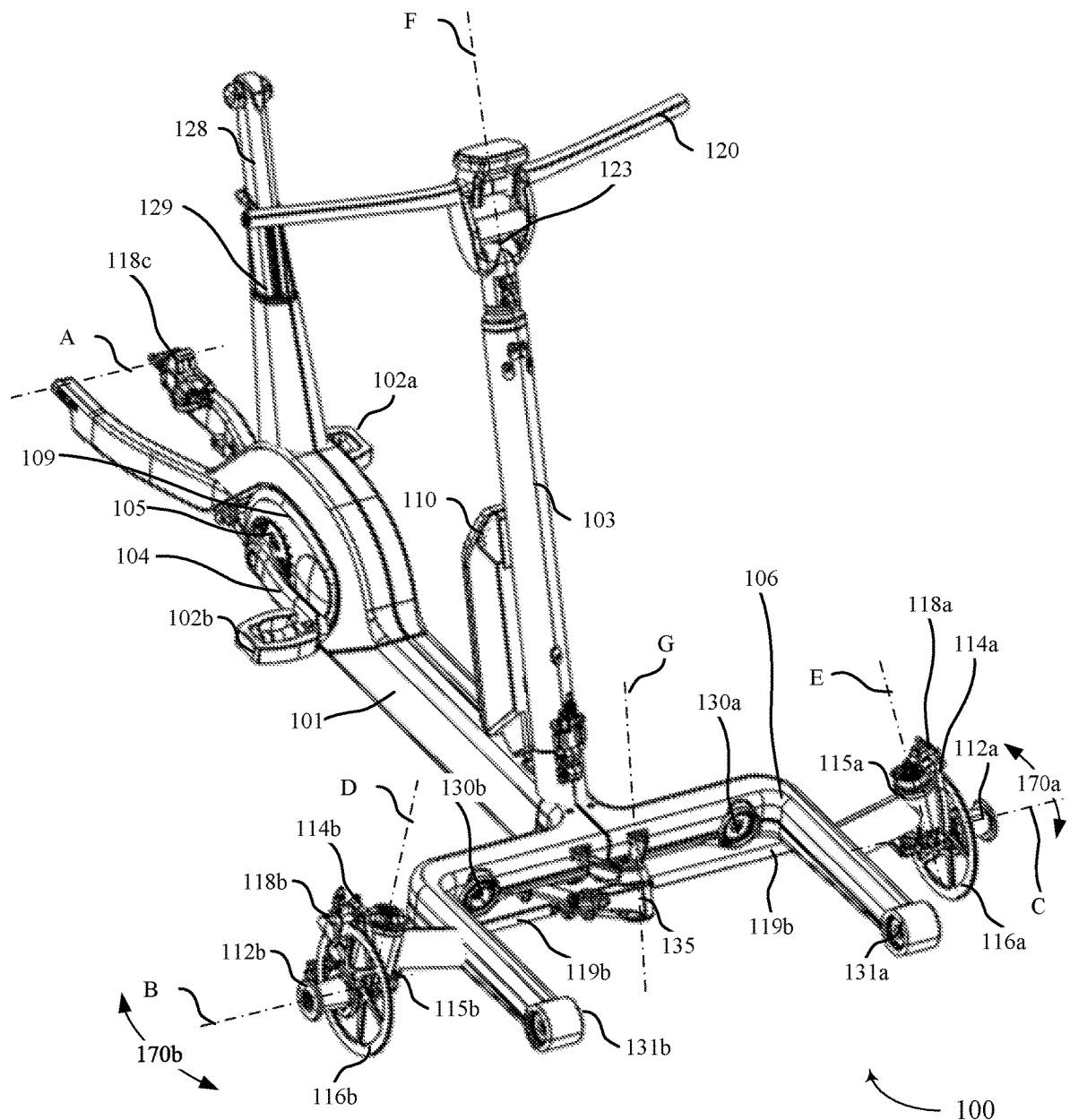
FIG. 3 is a perspective view of an example vehicle usable with an interchangeable cargo carrying portion and adjustable footrest in accordance with one aspect of the disclosure.

FIGS. 1-3 show one example of a vehicle in accordance with and usable with aspects of the present disclosure. While FIGS. 1-3 show a vehicle having pedal features (e.g., pedal powered, starting, or assist), a "vehicle," as used herein is not limited to such a vehicle having pedals, and refers to any moving vehicle that is powered by any form of energy. A vehicle may carry human occupants or cargo or both.

FIGS. 1 and 2 show perspective views of an example vehicle 100 having and/or usable with various features in accordance with aspects of the current disclosure. It is noted that at least one example and/or further details for a number of the components referenced in the vehicle 100 in FIGS. 1 and 2 are described in further detail with reference to FIGS. 3-8. As shown in FIGS. 1 and 2, an example vehicle 100, may be configured to have an interchangeable passenger carrying portion (e.g., reference 70b in FIG. 1) and/or a cargo carrying portion (e.g., reference 70a in FIG. 2) mounted thereto, such as on or in the area of U-shaped portion 106 (FIG. 3) of the vehicle 100. As shown in FIGS. 1 and 2, the interchangeable passenger/cargo carrying portion may, for example, include a seat 68b (FIG. 1) for carrying a single or multiple passengers and/or provide a cargo area 68a (FIG. 2) for storage and/or transportation of cargo via the vehicle 100. One example of an interchangeable cargo carrying portion and/or further features that are usable with the currently disclosed example vehicle are disclosed in U.S. patent application Ser. No. 16/542,702, titled "Convertible Passenger and Cargo Area for Vehicle," filed on Aug. 16, 2019, and U.S. patent application Ser. No. 16/370,408, to titled "Vehicle Steering System," filed on Mar. 29, 2019; the entirety of which are both incorporated by reference herein.

As shown in FIGS. 1 and 2, the vehicle 100 may include a rear wheel 50a and a pair of front wheels 50b (FIG. 2) and 50c (FIG. 1). A "wheel" or "wheels" as used herein may include a hub and extending surface (e.g., disk) portion contiguous with an outer rim. In one non-limiting example implementation, the hub may be connected to the rim via a series of tensioned spokes and/or other features. The rim may be configured to receive a tire, which may or may not be configured to contain an inflatable tube. As an alternative, the tire may be formed of a solid elastic material, and/or a material having a plurality of open and/or closed cells within an elastic material, which may include rubber, for example. The wheel hub, disk, spokes, and/or wheel rim may be formed, for example, of a metallic material, a plastic material, a composite material, or any combination thereof.

The vehicle 100 may include a frame 101, which may comprise a rigid or semi-rigid material, such as one or more plastic, composite, metals, or combinations thereof. The vehicle 100 may further include a steering tube 103 (FIG. 2) and a steering portion 120 (FIG. 2), which may, for example, include one or more extending handlebars. The vehicle 100 may further include a seat 127 mounted to a seatpost 128.

The rear wheel 50a (FIGS. 1 and 2) and the two front wheels 50b and 50c (FIGS. 1 and 2) of vehicle 100 may rotate radially about axes B and C (FIG. 3). Each of the front wheels 50c and 50b (FIGS. 1 and 2) may include hub(s) 112a and 112b, respectively that are mountable via knuckles 114a and 114b (FIG. 3), respectively, to U-shaped portion 106 of the vehicle frame 101. For one example of knuckles 114a and 114b, which may be interchangeably referred to as knuckle assemblies, each hub 112a and 112b may have a respective brake disk 116a and 116b mounted for operation in relation thereto. Each brake disk 116a and 116b may be configured to be selectively engaged with a friction or other resistive force for braking movement thereof, such as via respective brake calipers 118a and 118b configured to provide selective clamping force to each brake disk 116a and 116b so as to thereby slow or prevent movement of the attached wheels. Alternatively, other non-frictional force may be used for such braking power, such as electromagnetic based resistive force.

While not shown in FIG. 3, a similar brake disk or other braking configuration as described with relation to the rotation of front wheels 50c and 50b (FIGS. 1 and 2, respectively) about axes C and B (FIG. 3) may be mounted to the rear of the frame 101, thereby similarly allowing braking to be applied to a rear wheel rotating about axis A. For example, a rear brake caliper 118c, which may be similar to front brake caliper(s) 118a-b, may also be located and configured to selectively clamp a brake disk in order to provide a friction force to the brake disk to inhibit or stop rotation of the rear wheel, thereby providing a stopping force to the vehicle 100. Each of brake calipers 118a, 118b, and 118c may provide a resistive force to each wheel in response to a user of the vehicle depressing or otherwise engaging a brake lever or other braking mechanism (not shown). In one example, both front brake calipers 118a and 118b may provide a clamping force to disks 116a and 116b respectively in response to a user depressing a first brake lever (not shown) mounted proximal to a first end of handlebar 120. Rear caliper 118c may be configured to apply a clamping force to a rear brake disk (not shown) mounted to a rear wheel 50a (FIGS. 1 and 2) rotating about axis A (FIG. 3) in response to a user depressing a second brake lever (not shown) mounted proximal to a second end of handlebar 120.

As indicated above, each of front hubs 112a and 112b may be rotatably mountable to a respective knuckle 114a and 114b, and each respective knuckle 114a and 114b may be pivotably mounted to arms 115a and 115b and configured to pivot with respect to frame 101. For example, such pivoting of knuckles 114a and 114b may be in directions denoted by arrows 170a and 170b about axes E and D, respectively. Brake calibers 118a and 118b and hubs 112a and 112b, along with corresponding wheels 50c and 50b (FIGS. 1A and 1B) may be mounted to each respective knuckle or knuckle assembly 114a and 114b and similarly rotate therewith about axes E and D, respectively. As discussed in further detail below, a pivoting force applied by a user, for example, to handlebar 120 may cause each hub 112a and 112b, and thus each respective wheel and other corresponding features, to pivot in directions denoted by arrows 170a and 170b, so as to allow the vehicle to turn in a desired direction.

As shown in FIG. 3, the vehicle frame 101 may further include a seat tube 129 for receiving a seat post 128. The seat post 128 may be configured to have a seat 127 (FIGS. 1 and 2) mounted thereto. The seat post 128 may be configured to telescope within seat tube 129, thereby allowing for adjustment of the seat height of the vehicle 100. The vehicle 100 may include pedals 102a and 102b, which may be rotatably connected to a corresponding first 104*a* and second crank 104*b*. The cranks 104*a* and 104*b* may be rotatably connected to a shaft extending from the vehicle frame 101. The shaft may also be connected to and extend into or through a sprocket 105 that is configured to mesh with a chain or belt (not shown) for driving the rear wheel (not shown in FIG. 3) about axis A. The vehicle 100 may alternatively or also be equipped with an assist motor 109, such as an electric or other powered motor. The motor 109 may be selectively operable via the pedals 102*a*, 102*b*, for example, to provide starting motion and/or additional selective rotational force or assist for driving the rear wheel 51*a* (FIGS. 1 and 2) that rotates about axis A (FIG. 3). The pedals 102*a* and 102*b* may also be selectively usable with the motor in a manner so as to charge any battery connected thereto.

In one example implementation, the motor 109 may be selectively electrically powered by battery 110. However, the motor 109 and rotational cranks 104 and sprocket 105 shown in FIG. 3 may serve only as one example implementation. For example, as an alternative to or in addition to motor 109, a motor may be located proximal to or within a rear hub that rotates around axis A. Further, as an alternative to or in addition to the aforementioned examples, one or more motors may be located proximal to or at one of or both of front hubs 112*a* and 112*b*. In another aspect of the disclosure, the battery 10 may, for example, be implemented into the frame 101 and/or within the interchangeable passenger carrying portion (e.g., reference 70*b* in FIG. 1) and/or the cargo carrying portion (e.g., reference 70*a* in FIG. 2). In one example, the interchangeable carrying portions (e.g., 70*a* and 70*b*) may include batteries of different capacities and the frame and interchangeable carrying portion may include corresponding connectors and/or connection terminals (not shown) to operatively connect each battery with the motor 109 when a specific interchangeable carrying portion is mounted to the vehicle frame 101.

As further shown in FIG. 3, the interchangeable passenger/cargo carrying portions 70*a* or 70*b* (FIGS. 1 and 2) may be mounted to and supported by a U-shaped portion 106 via rear mounts 130*a* and 130*b*. The rear mounts 130*a* and 130*b* may, for example, each include a substantially concave receiving portion for assisting in receiving and directing corresponding first and second protruding extensions (e.g., extending from mount 211*a* in FIG. 6) attached to the interchangeable cargo carrying portions 70*a* and/or 70*b* (FIGS. 1 and 2). Receipt of such extensions into receiving locking openings in mounts 130*a*, 130*b*, may help properly position the passenger/cargo carrying portion. In addition, the U-shaped portion 106 of the vehicle frame 101 may further include side mounts 131*a* and 131*b*. The side mounts 131*a* and 131*b* may, for example, comprise a through hole for receiving a mounting pin or bolt for mounting via mounting portions 220*a* and 220*b* (FIG. 7) of the interchangeable passenger/cargo carrying portion 70*a* or 70*b* (FIGS. 2 and 1, respectively) in conjunction with positioning via the rear mounts 130*a*, 130*b*. Thus, rear mounts 130*a* and 130*b* and front mounts 131*a* and 131*b* may allow for interchangeable mounting of one or more different types of carrying portions (e.g., 70*a* or 70*b*) to vehicle frame 101, for example.

In order to maintain the load floor of the cargo carrying portion supported by U-shaped portion 106 in a low position, the steering mechanism of vehicle 100 may advantageously be located below U-shaped portion 106 of frame 101. Further, by maintaining the steering mechanism of vehicle 100 at a location below the U-shaped portion 106 of frame 101, the interchangeable cargo carrying portion, which may for example be a passenger carrying portion as discussed in further detail herein, may be removed and installed with reduced risk of damage to the steering components and/or the cargo carrying portion. In addition, for proper weight distribution of the vehicle 100, when a cargo carrying portion is mounted to frame 101, such as when carrying a load, for example, it may be advantageous to have the rotation axis B and C of each front wheel located well forward of the rotation axis F of handlebars 120, such as with relation to a forward travel direction of the vehicle 100.

Figure 4:
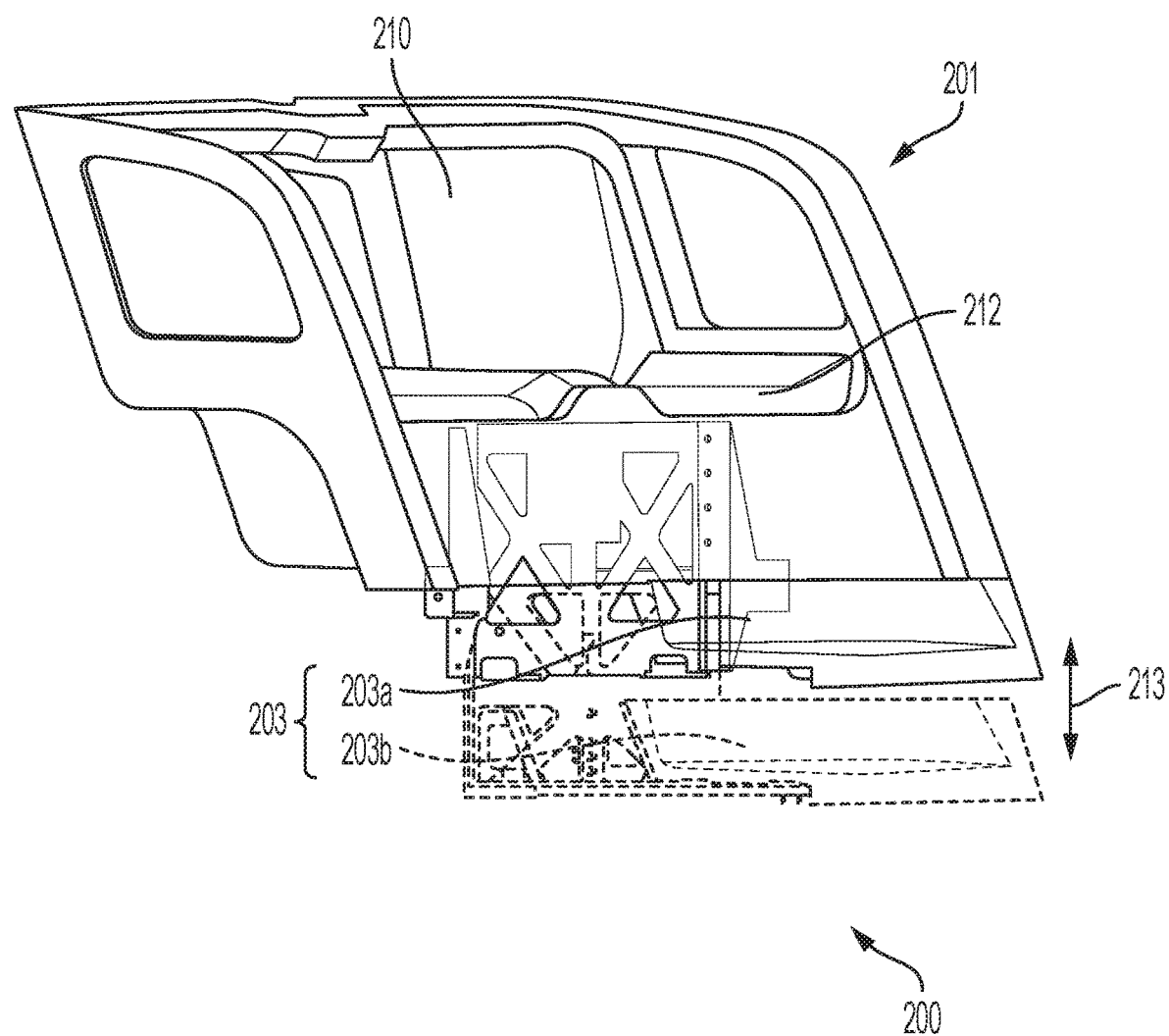
FIG. 4 is a front perspective partial see-through view of an example passenger carrying portion and adjustable footrest in accordance with one aspect of the disclosure.

FIG. 4 shows a partial see-through view of an example of an interchangeable passenger carrying portion 200 for use with an example vehicle, in accordance with aspects of the current disclosure. The passenger carrying portion 200 may be interchangeably mounted to and usable with the vehicle shown in FIGS. 1-3, for example. The interchangeable passenger carrying portion 200 may include a seat portion 201 and moveable footrest 203. The seat portion 201 may include a seating surface having a backrest 210 and a seat surface 212. Further, the interchangeable passenger carrying portion 200 may include a footrest that is movable from a lowered ingress/egress position 203*b* to a raised transportation position 203*a* and vice-versa as represented by arrows 213.

Figure 5:
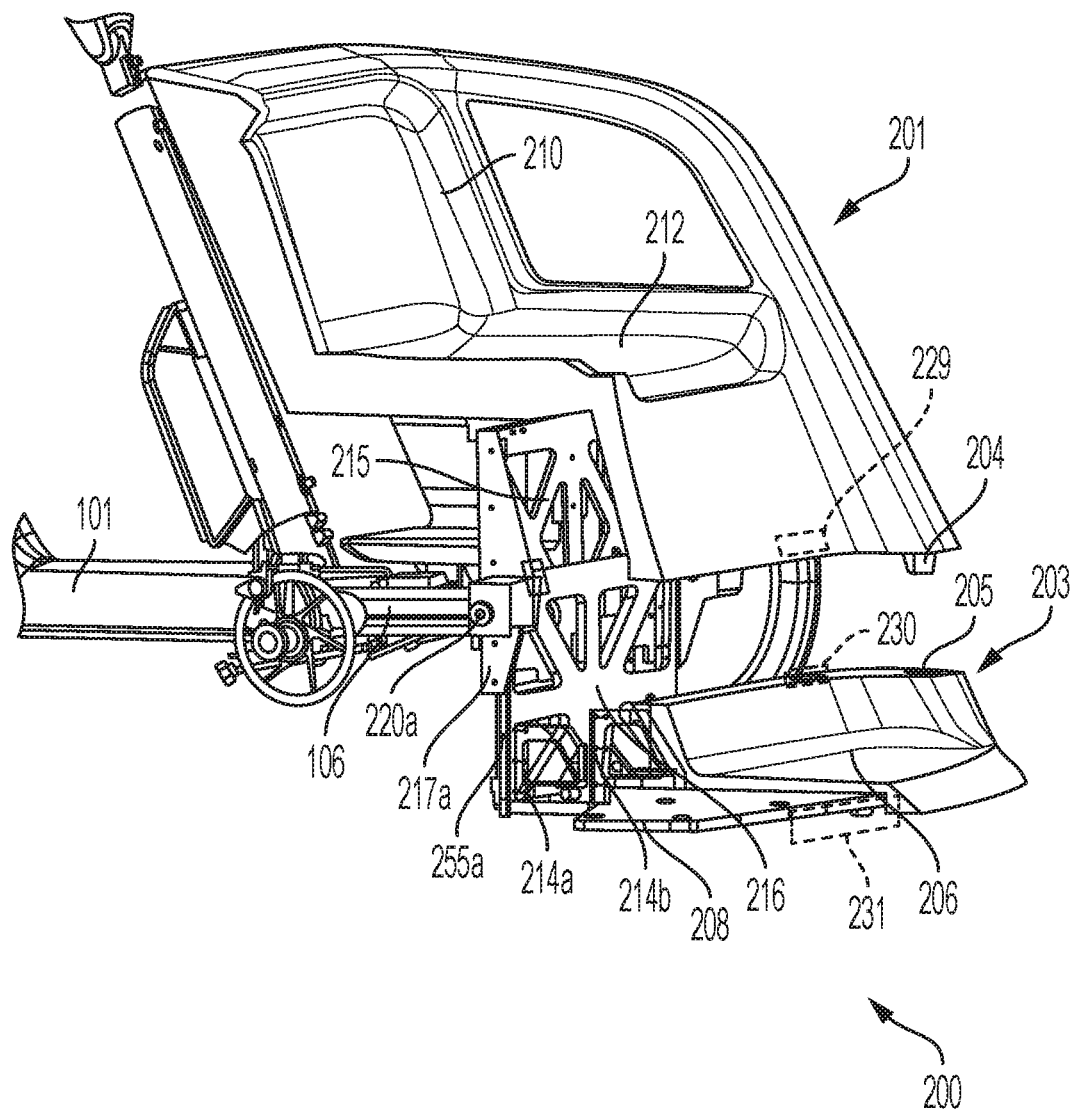
FIG. 5 is a front perspective cut-away view of the passenger carrying portion and adjustable footrest of FIG. 4 shown as mounted to the vehicle of FIG. 3 in accordance with one aspect of the disclosure.

FIG. 5 is a cutaway view of various aspects of the passenger carrying portion 200 of FIG. 2, showing further details of one example of the seat portion 201 and moveable footrest 203 in an ingress/egress (lowered) position (e.g., 203*b* in FIG. 4). The seat portion 201 and moveable footrest 203 may include a set of mounting frames 217*a* and 217*b* (hidden from view in FIG. 5) that may be rigidly connected via a first cross-member 215. Each of the mounting frames 217*a* and 217*b* may be mountable to a U-shaped portion 106 of vehicle frame 101 via mounting portions 220*a* and 220*b* (hidden from view in FIG. 5). The mounting frames 217*a* and 217*b* may be configured to receive side mounts 131*a* and 131*b* (FIG. 3). Mounting frames 217*a* and 217*b* may for example comprise through holes for receiving a mounting pin or bolt configured to pass through mounting frames 217*a* and 217*b* (FIG. 7) and each corresponding side mount 131*a* and 131*b* (FIG. 3), for example. As shown, for example, in FIG. 6, the seat portion 201 may further include rear mounting portions 211*a* and 211*b* (hidden behind the vehicle frame in FIG. 6) configured to be mounted and/or positioned via the rear mounts 130*a*, 130*b* of the U-shaped portion of frame 106.

Figure 6:
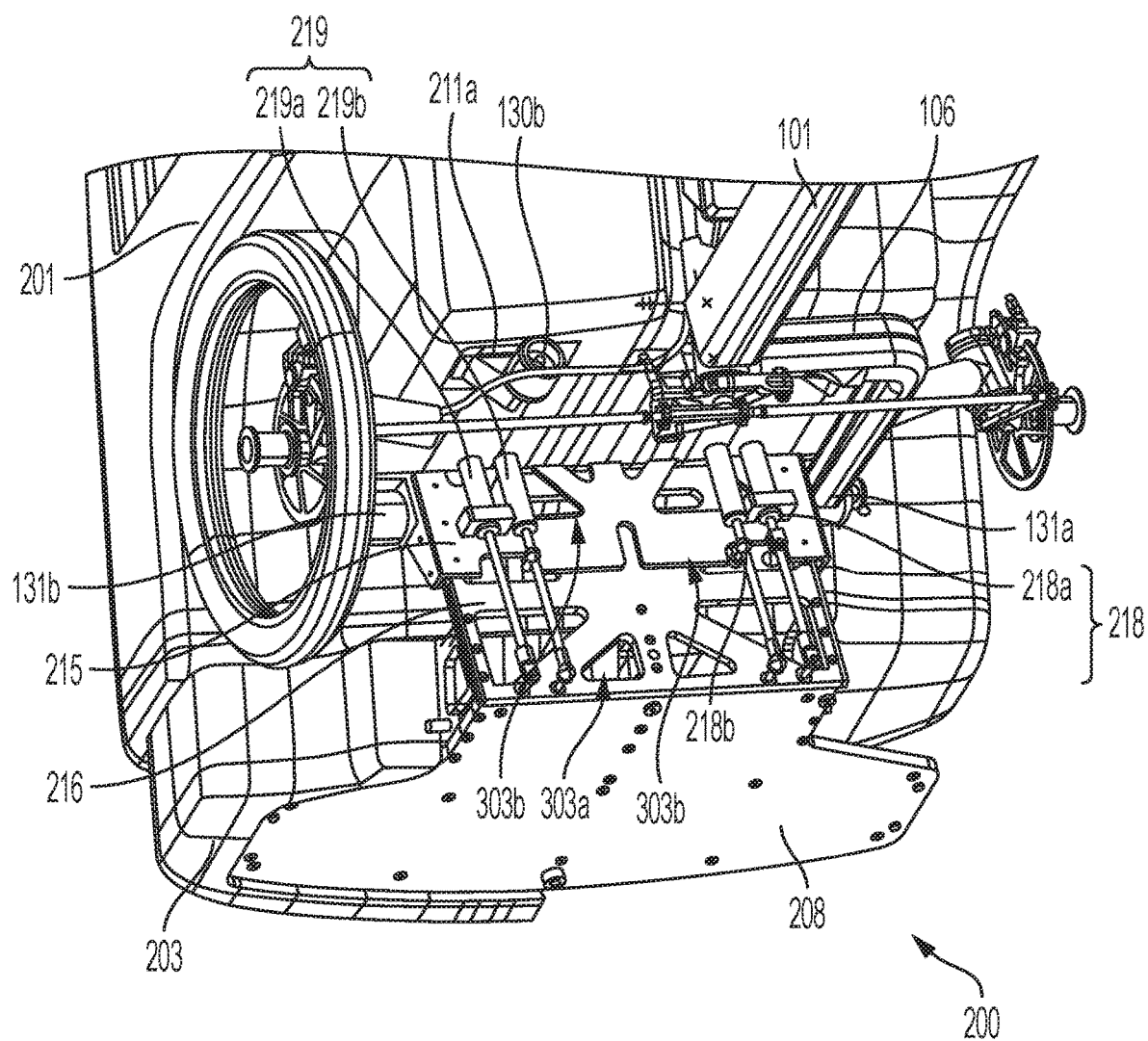
FIG. 6 is a bottom perspective cut-away view of the passenger carrying portion and adjustable footrest of FIGS. 4-5 shown as mounted to the vehicle of FIG. 2 in accordance with one aspect of the disclosure.
Figure 7:
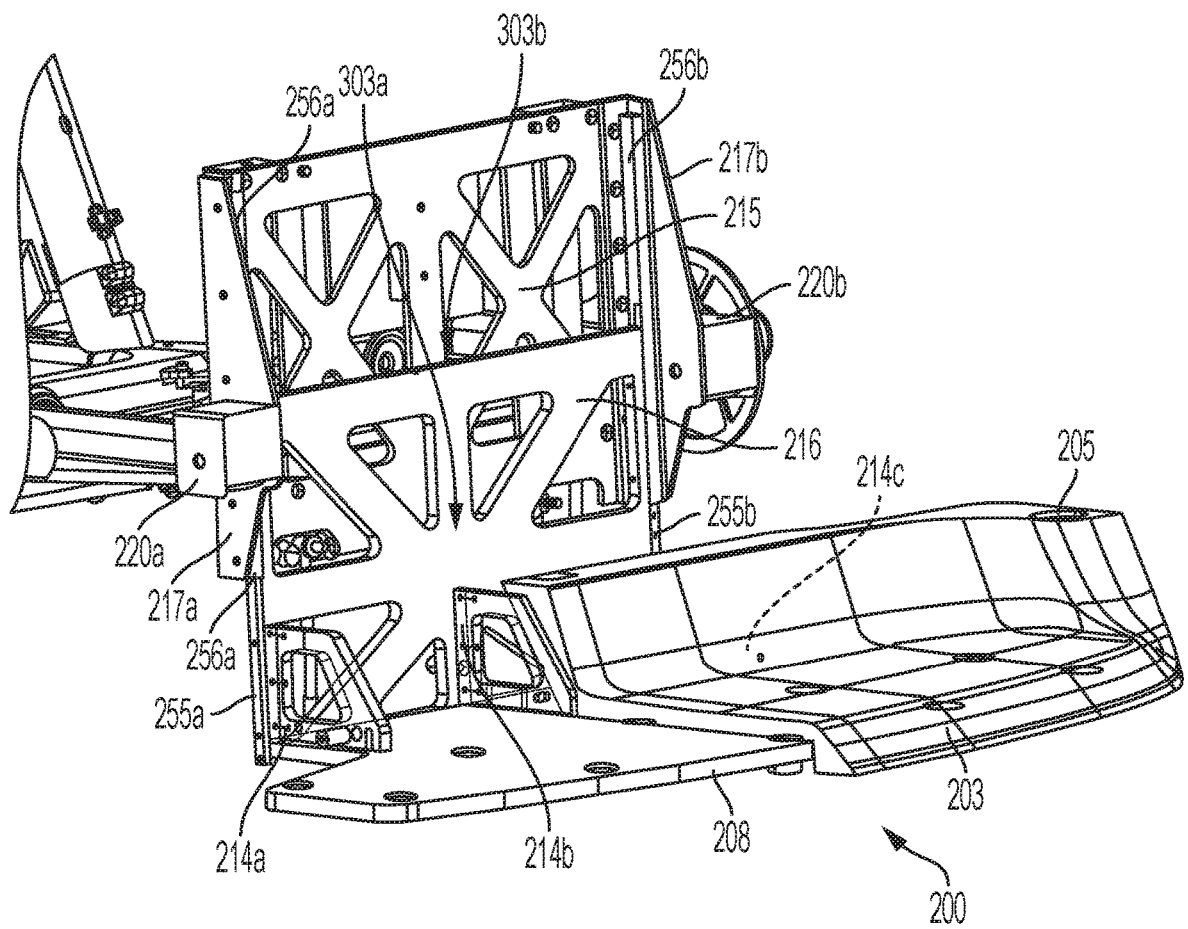
FIG. 7 is a front perspective cut-away view of the adjustable footrest and actuator mechanism of FIGS. 4-6 shown as mounted to the vehicle of FIG. 2 in accordance with one aspect of the disclosure.

Turning to FIGS. 5-8, the moveable footrest 203 may include a footrest platform portion 206 that is mounted to a footrest platform frame 208. The footrest platform frame 208 and/or the moveable footrest 203 may be mounted to a second cross-member 216. In one example, the second cross-member 216 may be mounted to the footrest platform frame 208 via a gusset 214*a* and or a series of gussets (e.g., 214*a*, 214*b*, 214*c* (FIG. 7)). The second cross-member 216 may be mounted to the first cross-member 215 and/or mounting frames 217*a* and 217*b* and configured to be selectively moveable in a raised direction 303*b* (FIGS. 6 and 7) and lowered direction 303*a* (FIGS. 6 and 7) with respect to the first cross-member 215. In one aspect, as shown in FIG. 7, for example, the first cross member 215 and/or each respective mounting frames 217*a* and 217*b* may have tracks 255*a* and 255*b* mounted respectively thereto. The set of tracks 255*a* and 255*b* may be configured to interoperate with and slidably support a set of tracks 256*a* and 256*b* mounted to the second cross-member 216. The seat portion 201 may further include a seat centering feature 204 (FIG. 5) that is configured to interoperate with a footrest centering feature 205 to align the seat portion 201 with the footrest 203 as the footrest is moved to the upper position.

Figure 8:
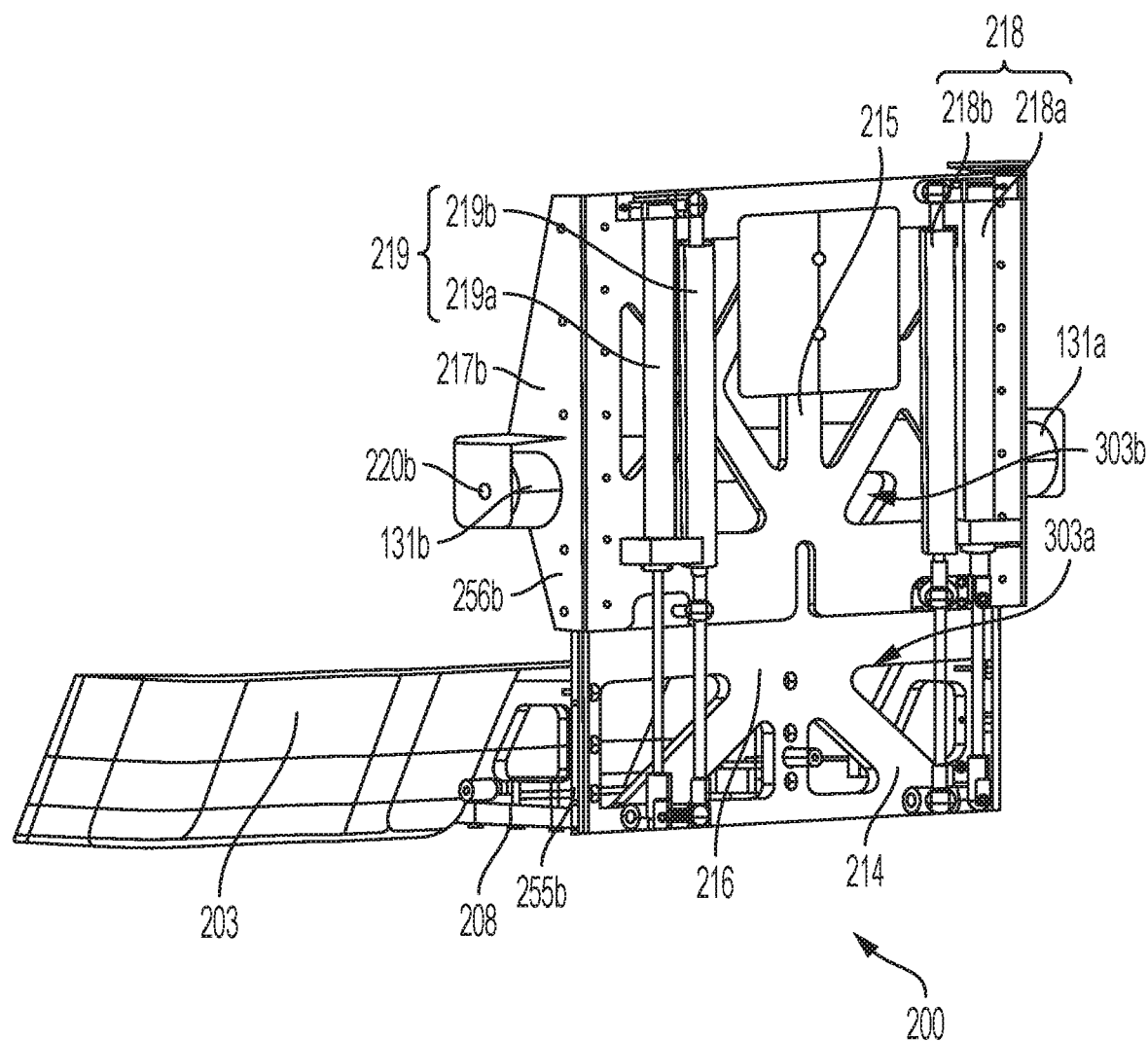
FIG. 8 is a rear perspective view of the adjustable footrest and actuator mechanism of FIGS. 4-7 shown as mounted to the vehicle of FIG. 2 in accordance with one aspect of the disclosure.

FIGS. 6-8 show one example of a footrest movement mechanism for controlling movement of the moveable footrest 203 with respect to the seat portion 201. In one example, the footrest movement mechanism may include a set of footrest movement mechanisms 219 and 218. Each of the footrest movement mechanisms 219, 218 may include a biasing member 219b and 218b, respectively, and a movement control member 219a and 218a, respectively. Biasing members 219b and 218b may, for example. comprise one or more spring loaded and/or gas pressurized struts operatively connected to the first cross-member 215 and the second cross-member 216. In the aforementioned example, the biasing members 219b and 218b may be configured to bias the footrest in the upward position 303b. The movement control members 219a and 218a may be configured to selectively apply a force at least equal to and opposite the biasing force provided by biasing members 219b and 218b, respectively, thereby allowing the footrest to selectively remain in the ingress/egress position 203b (FIG. 4), for example, once the footrest is lowered. In operation, the weight of a passenger stepping on moveable footrest 203 and/or the force proved by the movement control members 219a and 218a may provide a force sufficient to overcome the biasing force provided by biasing members 219b and 218b, such that the footrest may move to the ingress/egress position 203b (FIG. 4). Once the footrest is moved to the ingress/egress position 203b (FIG. 4), the movement control members 219a and 218a may prevent return of the footrest to the transport position 305b (FIG. 4) until the movement control member is activated by the user (e.g., when the passenger is seated in the seat surface 212). In one example implementation, the control members 219a and 218a may, for example, be activated via a cable connected to a lever mounted to handlebar 120 (FIG. 3). In another example implementation, the movement control members may be electrically activated via a switch or other control interface mounted to handlebar 120 (FIG. 3) or at another location. Some examples of mechanisms usable as control members 219a and 218a are disclosed in U.S. Patent Application No. 2015/0151804 to Camp et al., titled "Automatic Drop Seatpost," filed on Sep. 8, 2014 and/or U.S. Patent Application No. 2011/0049945 to Mouri et al., titled "Motorized Bicycle Seatpost Assembly," filed on Aug. 28, 2009, which are hereby incorporated by reference herein. In adapting the aforementioned disclosures to be useable in accordance with various features of the present disclosure, the seat mounting end in the aforementioned examples may be adapted to be mounted to the second cross-member 216, and the outer tube or body of each of the aforementioned seat post assemblies may be mounted to the first cross-member 215, for example. In another example, the biasing members 219b and 218b may be omitted, and the movement of the moveable footrest 203 may be controlled simply by control members 219a and 218a.

In another aspect of the disclosure, each of footrest movement mechanisms 219 and 218 may include a single or plurality biasing mechanisms. Thus, references 219a, 219b, and/or 218a, 218b may for example all comprise spring loaded and/or gas pressurized struts operatively connected to the first cross-member 215 and the second cross-member 216. In operation, the weight of a passenger stepping on moveable footrest 203 may provide a force sufficient to overcome the biasing force provided by biasing members 219a, 219b, and 218a, 218b, thus the footrest may move to the ingress/egress position 203b (FIG. 4). Once the passenger is seated on the seat surface 212 (FIG. 5) the weight of the passenger stepping on moveable footrest 203 may be reduced causing the footrest to return to the transport position 203a (FIG. 4) via the biasing force provided by any one of, combination of, or all of biasing members 219a, 219b, and 218a, 218b.

In another aspect, the set of footrest movement mechanisms 219 and 218, may for example comprise a single or multiple linear actuators. The linear actuators may for example be pneumatically, hydraulically, and/or electrically controlled. Some examples of linear actuator mechanisms usable as each one of footrest movement mechanisms 219 and 218 is disclosed in U.S. Pat. No. 3,350,065 to Mankey, titled "Scissor-Type Linear Actuator With High Extension Ratio and Selectable Extension Rate and Power Requirement," filed on Oct. 31, 1967 and/or U.S. Pat. No. 4,858,481 to Abraham, titled "Position Controlled Linear Actuator," filed on Aug. 22, 1989, and/or U.S. Pat. No. 5,557,154 to Erhard, titled "Linear Actuator With Feedback Position Sensor Device," filed on Sep. 17, 1996, which are all hereby incorporated by reference herein.

In adapting the aforementioned disclosures to be useable with the current disclosure, one end of a linear actuator may be mounted to the second cross-member 216, and the other end of the linear actuator may be mounted to the first cross-member 215, for example. A source of electric current may be selectively supplied by the battery 110 (FIG. 3) and/or by a battery within or connected to the interchangeable passenger portion 200, to activate or power the linear actuator, for example. A switch or other interface may be provided on handlebar 120 for controlling movement of the linear actuator and moveable footrest 203 in directions 303a and/or 303b by controlling the flow of current to, and/or for providing current for activation of the linear actuator.

As shown in FIG. 5, the disclosed vehicle may further include a first footrest detector portion 229. The first footrest detector portion 229 may provide detection of any foreign objects that may exist between the footrest platform 206 and/or the seat portion 201 as shown in FIG. 5, for example. In combination with the control system described in further detail below, the first footrest detection portion 229 may provide a signal that prevents a controller from advancing the footrest 206 in an upward 303b (FIG. 8) and/or downward 303a position until the object is removed and no longer detected in a space between the footrest platform 206 and the seat surface portion 201. The first footrest detection portion 229 may include at least one of or any combination of a proximity sensor, an optical sensor, an electromagnetic sensor, an ultrasonic sensor, a capacitive sensor, or any known sensor capable providing an output that corresponds with the detection of a foreign object or a distance of the sensor from an object. In one example, the system may further include a second footrest position detector portion 230. In one example the first and/or second footrest detector portions 229 and 230 may include an emitter and the other of the first and second footrest detector portions 229 and 230 may include a detector that outputs a signal that corresponds to the blockage of a path between the emitter and the detector. In another example, one of the first and second detector portions 229 and 330 may include a conductive layer (e.g., copper), and the other of the first and second detection portions 229 and 330 may include a capacitive sensor. In the aforementioned example, a controller (described in further detail below) may prevent a controller from advancing the footrest 206 in an upward 303b (FIG. 8) and/or downward 303a position until the object is removed and no longer detected in a space between the footrest platform 206 and the seat surface portion 201, based on an output from at least one of the first and second detection portions 229 and 330.

Further, the footrest and/or footrest platform frame 208 may include a touchdown detection portion 231. The touchdown detection portion may a sensor or series of sensors to detect a distance between the bottom of the footrest and the ground when the vehicle is in the in-use position. In one example, the touchdown sensor may be embedded in the footrest platform and/or footrest platform frame and my include any one of or a combination of a proximity sensor, an optical sensor, an electromagnetic sensor, an ultrasonic sensor, a capacitive sensor, or any known sensor capable providing an output that corresponds with the distance of the sensor from an object or a surface. In addition, the touchdown detection system 231 may comprise a contact sensor or a plurality of contact sensors that provide an output that corresponds to contact of the footrest 206 and/or footrest platform frame with an object or surface. One example of a touchdown detection may include a sensor array as described in further detail with respect to FIGS. 9 and 10A-C below. It is noted that while only a portion of the bottom of the footrest platform 206 and/or footrest platform frame is referenced, the entire surface or any other portion of combination of portions of the footrest platform 206 and/or footrest platform frame 208 may include a number of sensors or detectors capable of determining at least one of a distance between or contact with a surface or object and the footrest platform 206 and/or footrest platform frame 208. The incorporation of the touchdown detection portion may prevent undesired contact between the footrest platform and/or footrest platform frame and objects or surfaces.

In addition, the touchdown detection system 231 may comprise a contact sensor or a plurality of contact sensors that provide an output that corresponds to contact of the footrest 206 and/or footrest platform frame with an object or surface. One example of a touchdown detection may include a sensor array as described in further detail with respect to FIG. 9 below. It is noted that while only a portion of the bottom of the footrest platform 206 and/or footrest platform frame is referenced, the entire surface or any other portion of combination of portions of the footrest platform 206 and/or footrest platform frame 208 may include a number of sensors or detectors capable of determining at least one of a distance between or contact with a surface or object and the footrest platform 206 and/or footrest platform frame 208.

Figure 9:
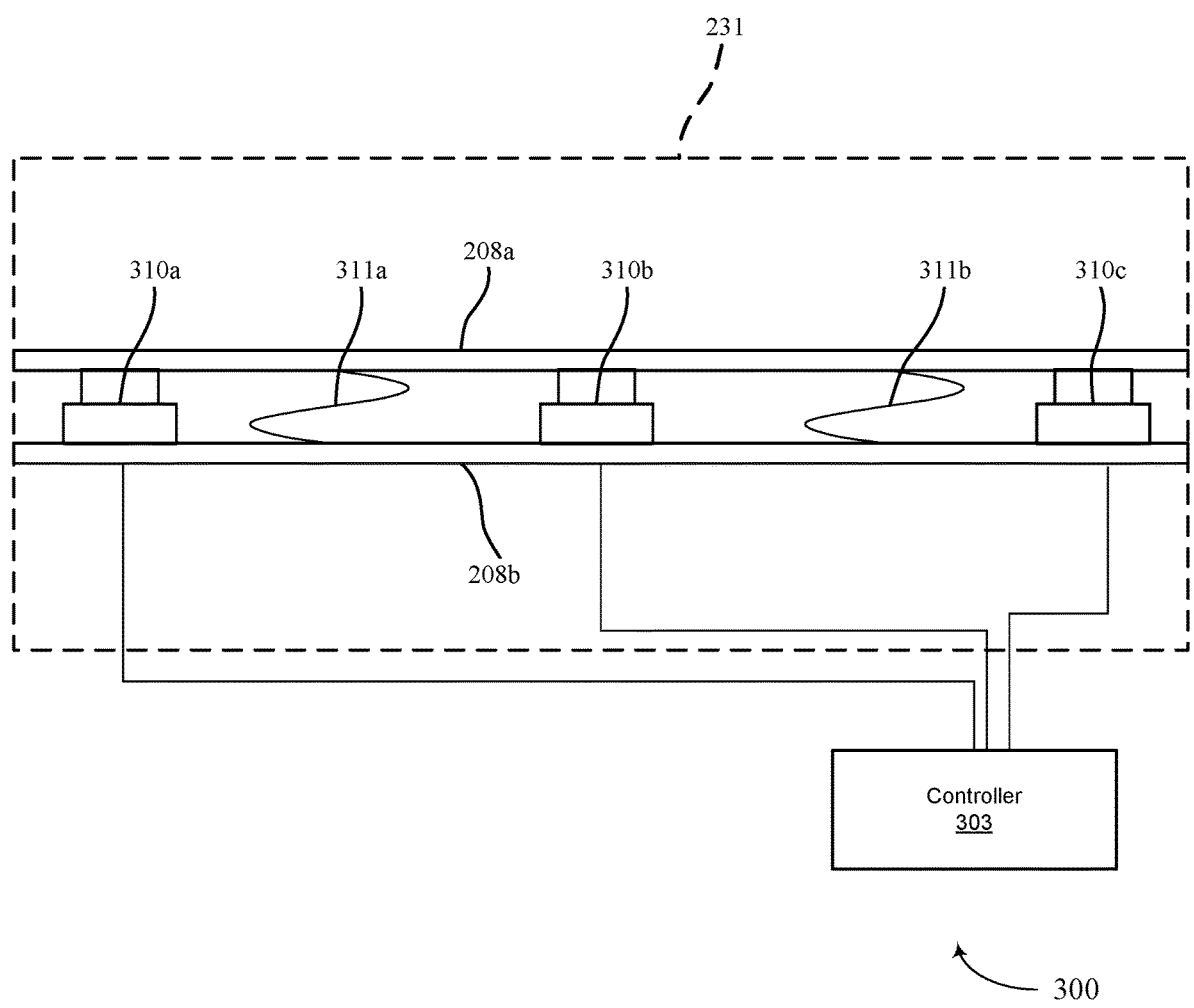
FIG. 9 is a diagram view of an example sensor in accordance with one aspect of the disclosure.

FIG. 9 shows one example of a touchdown detection portion 231. In one example the footrest platform frame may for example include a substrate having a first layer 208a and a second layer 208b having at least one or a plurality of sensors 310a-310c disposed therebetween. The plurality of sensors 310a-310c, may for example include any one or a combination of a load cell, a switch, a pressure sensor, a capacitive sensor, and inductive sensor, to name a few examples. The plurality of sensors 310a-310c may output a signal to a controller 303 for example. As mentioned above, and as further described with reference to FIG. 10C below, the controller 303 may work in conjunction with another controller and/or may be a primary controller of the control system and may determine to stop movement of the footrest when it is determined that the second surface 208b has come into contact with a surface of an object. In one example, the detection portion 231 may further include a single or plurality of biasing members 311a and 311b to provide increase the accuracy of detection by biasing the first layer 208a and second layer 208b away from one another.

Figure 10A:
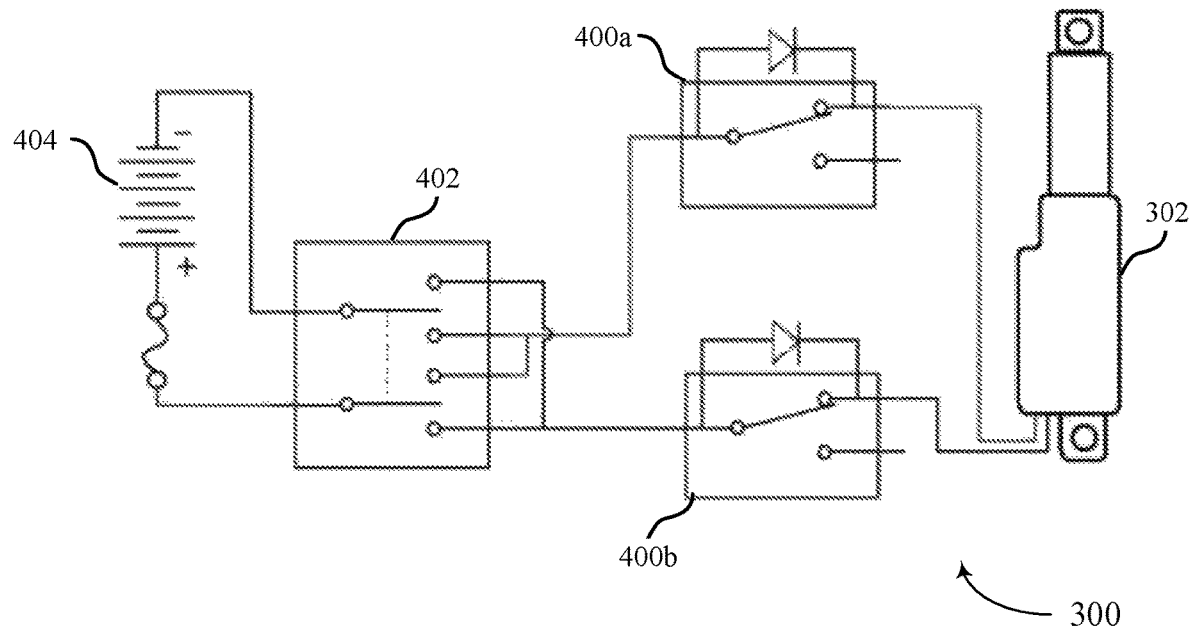
FIG. 10A is an circuit diagram of various example system components according to one aspect of the disclosure.

FIG. 10A is one example of an actuator control circuit in accordance with one aspect of the disclosure. The actuator control 300 may include a power supply and/or power source 404, which may for example be the battery or in signal communication with battery 110 (FIG. 3) and/or a battery within or connected to the interchangeable passenger portion, for example. Switch 403, may be proved on handlebar 120 (FIG. 3) for selectively applying current to the actuator 302. Further, the actuator control may include limit switches 400a and 400b for limiting the extension/retraction of actuator 302.

Figure 10B:
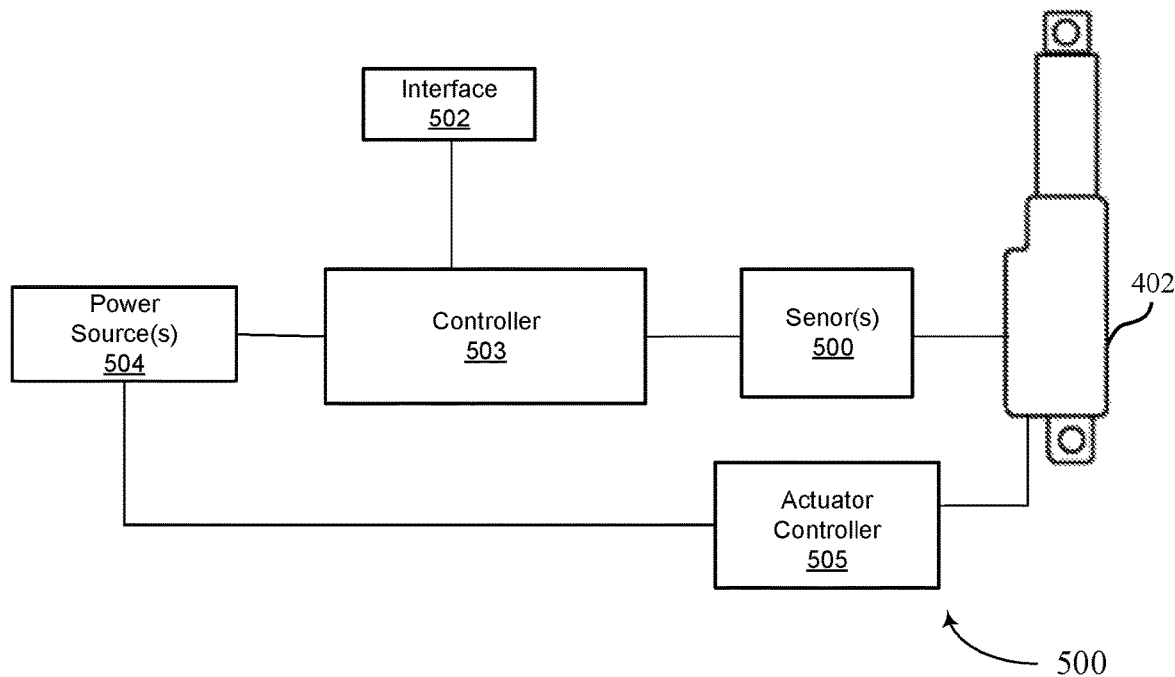
FIG. 10B is a block diagram of various example system components according to one aspect of the disclosure.

FIG. 10B is another example of an actuator control in accordance with one aspect of the disclosure. The actuator control 500 may include a power source or multiple power sources and/or power supplies 504 which may for example be the battery or in signal communication with battery 110 (FIG. 3) and/or a battery within or connected to the interchangeable passenger portion, for example. The actuator control may further include a single sensor or multiple sensors configured to output a signal indicative of the extension/retraction of actuator 402. In one example, the sensor 501 may include limit switches similar to limit switches 400a and 400b (FIG. 10A). In another example, the sensor 501 may include a single or plurality of optical sensor(s), potentiometer(s) and/or any sensor capable of outputting a signal indicative of the extension and/or retraction of the actuator 402. The actuator control 500 may further include an actuator controller, which may for example be an motor controller if the actuator uses an electric motor and/or electric valves for control of hydraulic fluid and/or fluid flow/pressure if the actuator 402 is hydraulic and or pneumatically operated. The system my further include in interface 502, which may for example be a switch, a series of switches, and/or an interface for displaying information and/or providing a user with a control interface for controlling movement of the actuator 402.

Figure 10C:
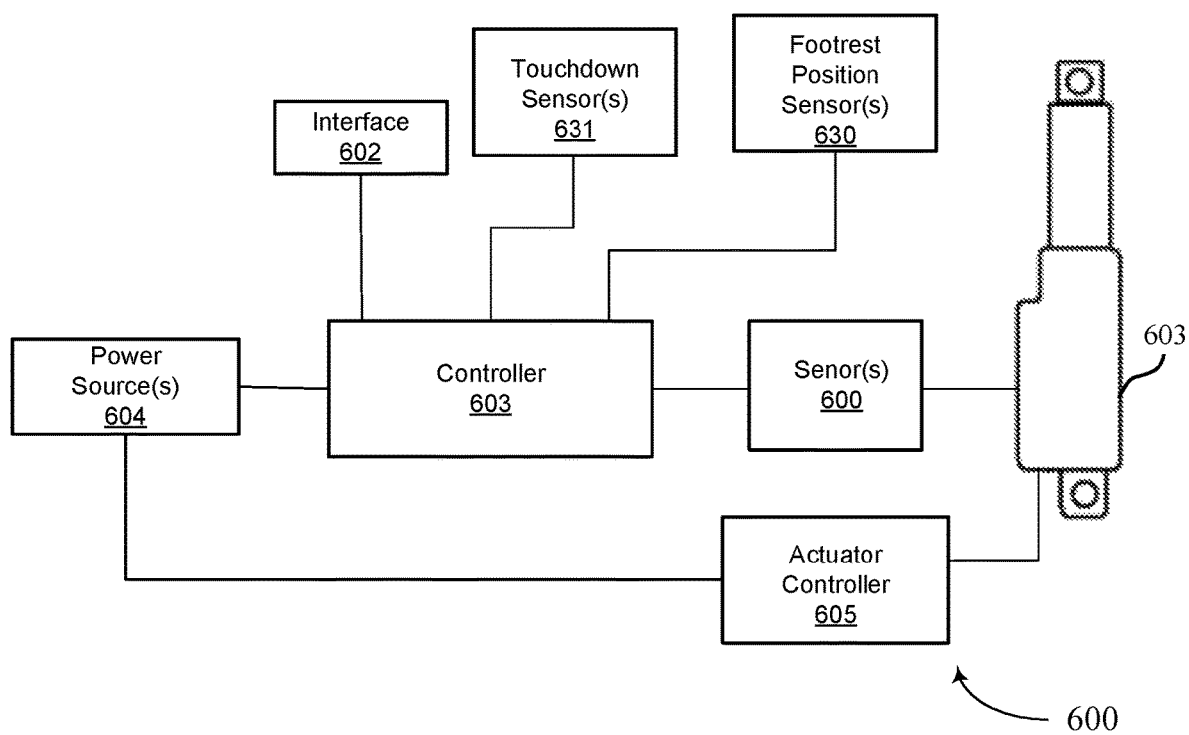
FIG. 10C is a block diagram of various example system components according to one aspect of the disclosure.

FIG. 10C is another example of an actuator control in accordance with one aspect of the disclosure. The actuator control 600 may include a power source or multiple power sources and/or power supplies 604 which may for example be the battery or in signal communication with battery 110 (FIG. 3) and/or a battery within or connected to the interchangeable passenger portion, for example. The actuator control may further include a single sensor or multiple sensors configured to output a signal indicative of the extension/retraction of actuator 603. In one example, the sensor 601 may include limit switches similar to limit switches 400a and 400b (FIG. 10A). In another example, the sensor 501 may include a single or plurality of optical sensor(s), potentiometer(s) and/or any sensor capable of outputting a signal indicative of the extension and/or retraction of the actuator 603. The actuator control 605 may further include an actuator controller, which may for example be an motor controller if the actuator uses an electric motor and/or electric valves for control of hydraulic fluid and/or fluid flow/pressure if the actuator 603 is hydraulic and or pneumatically operated. The system my further include in interface 602, which may for example be a switch, a series of switches, and/or an interface for displaying information and/or providing a user with a control interface for controlling movement of the actuator 603. The system may further comprise a touchdown sensor or sensors 631 (e.g., touchdown detection portion 231), which may provide a signal to the controller that the footrest platform 206 is close to or in contact with an object or the ground. Accordingly, in the aforementioned example, the controller may prevent further movement of the linear actuator in a direction corresponding to the downward direction of the footrest platform 206. Further, the controller may prevent further movement of the footrest in the upward direction if an output from the footrest position sensor or sensors 630 (e.g., first and/or second footrest detection portions), provide a signal indicative of an object or foreign object between the footrest platform 206 and the seat portion 201. Likewise, the controller may again allow movement of any of the aforementioned components once it is determined that no interference would occur between components during the movement of footrest platform 206.

Figure 11:
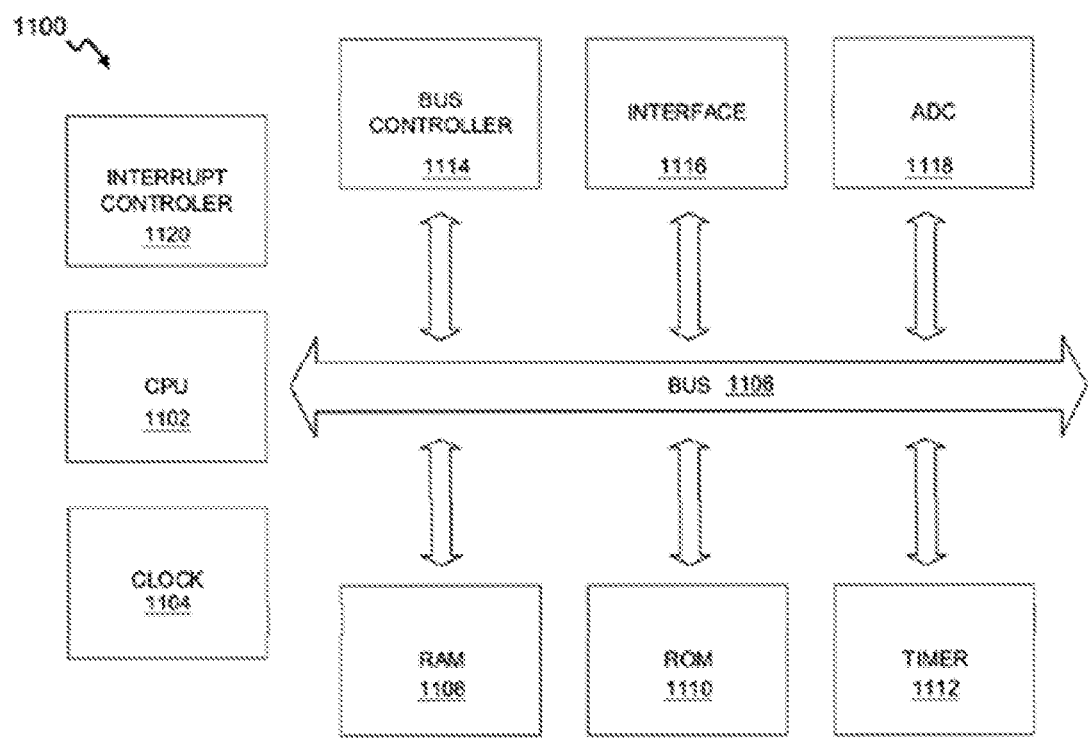
FIG. 11 is an example microcontroller in accordance with an aspect of the disclosure.

In some implementations, one or more microcontrollers may be implemented for carrying out certain features of the present disclosure, such as control features for controlling the actuator system 300 and/or 500 of FIGS. 9A-9B. An example of such a microcontroller 1100 is shown in FIG. 11. The microcontroller 1100 includes a CPU 1102, RAM 1108, ROM 1110, a timer 1112, a BUS controller 1114, an interface 1116, and an analog-to-digital converter (ADC) 1118 interconnected via an on board BUS 1106.

The CPU 1102 may be implemented as one or more single core or multi-core processors, and receive signals from an interrupt controller 1120 and a clock 1104. The clock 1104 sets the operating frequency of the entire microcontroller 1100 and may include one or more crystal oscillators having predetermined frequencies. Alternatively, the clock 1104 may receive an external clock signal. The interrupt controller 1120 may also send interrupt signals to the CPU to suspend CPU operations. The interrupt controller 1120 may transmit an interrupt signal to the CPU when an event requires immediate CPU attention.

The RAM 1108 may include one or more SRAM, DRAM, SDRAM, DDR SDRAM, DRRAM or other suitable volatile memory. The ROM 1110 may include one or more PROM, EPROM, EEPROM, flash memory, or other types of non-volatile memory.

The timer 1112 may keep time and/or calculate the amount of time between events occurring within the microcontroller 1100, count the number of events, and/or generate baud rate for communication transfer. The BUS controller 1114 prioritizes BUS usage within the microcontroller 1100. The ADC 1118 allows the microcontroller 1100 to send out pulses to signal other devices.

The interface 1116 is an input/output device that allows the microcontroller 1100 to exchange information with other devices. In some implementations, the interface 1116 may include one or more parallel port, a serial port, or other computer interfaces.

While several example implementations of the current disclosure are discussed above, it is noted that any one of, or combinations of components and aspects of each example implementation may be combinable and/or usable together. Thus each of the example implementations discussed above are not limited to the specific components and/or combination of components discussed therein.

This written description uses examples to disclose aspects of the disclosure, including the preferred aspects, and also to enable any person skilled in the art to practice the present disclosure, including making and using any devices or systems and performing any incorporated methods. The patentable scope hereof is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims. Aspects from the various aspects described, as well as other known equivalents for each such aspect, can be mixed and matched by one of ordinary skill in the art to construct additional aspects and techniques in accordance with principles of this application.

While the aspects described herein have been described in conjunction with the example aspects outlined above, various alternatives, modifications, variations, improvements, and/or substantial equivalents, whether known or that are or may be presently unforeseen, may become apparent to those having at least ordinary skill in the art. Accordingly, the example aspects, as set forth above, are intended to be illustrative, not limiting. Various changes may be made without departing from the spirit and scope of the disclosure. Therefore, the disclosure is intended to embrace all known or later-developed alternatives, modifications, variations, improvements, and/or substantial equivalents.

Reference to an element in the singular is not intended to mean "one and only one" unless specifically so stated, but rather "one or more." Further reference to more than one or a plurality of elements is not intended to mean "only more than one" or "only a plurality," and may include a single element. All structural and functional equivalents to the elements of the various aspects described throughout this disclosure that are known or later come to be known to those of ordinary skill in the art are expressly incorporated herein by reference. Moreover, nothing disclosed herein is intended to be dedicated to the public.

Further, the word "example" is used herein to mean "serving as an example, instance, or illustration." Any aspect described herein as "example" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C.

PARTS LIST FOR FIGURES

| Number | Part Names |
| --- | --- |
| 50a, b, c | wheels |
| 70a, b | cargo/passenger carrying portion |
| 68a | cargo area |
| 68b | passenger carrying portion seat |
| 100 | vehicle |
| 101 | vehicle frame |
| 102a, b | pedals |
| 103 | steering tube |
| 104a, b | cranks |
| 105 | sprocket |
| 106 | U-shaped portion |
| 109 | motor |
| 110 | battery |
| 112a, b | front hubs |
| 114a, b | knuckles |
| 115a, b | arms |
| 116a, b | brake disks |
| 118a-c | brake calipers |
| 119a, b | tie rods |
| 120 | handlebar |
| 123 | handlebar mount |

-continued

| Number | Part Names |
|---|---|
| 127 | seat |
| 128 | seat post |
| 129 | seat tube |
| 131a, b | side mounts |
| 200 | passenger carrying portion |
| 201 | seat portion |
| 203 | moveable footrest |
| 204 | seat centering feature |
| 205 | footrest centering feature |
| 206 | footrest platform |
| 208 | footrest platform frame |
| 210 | backrest |
| 211a, b | rear mounting portions |
| 212 | seat surface |
| 214a-c | gussets |
| 215 | first cross-member |
| 216 | second cross-member |
| 217a, b | mounting frames |
| 218, 219 | footrest movement mechanisms |
| 220a, b | mounting portions |
| 229 | first footrest detection portion |
| 230 | second footrest detection portion |
| 231 | touchdown detection portion |
| 255a, b | T racks |
| 300 | touchdown sensor array |
| 302 | actuator |
| 311a, b, c | detectors |
| 322a, b | biasing members |
| 303 | controller |
| 400a, b | limit switches |
| 402 | actuator |
| 403 | switch |
| 404 | power source |
| 500 | actuator control |
| 501 | sensor |
| 502 | interface |
| 504 | power supplies |
| 600 | actuator control |
| 601 | sensor |
| 602 | interface |
| 604 | power supplies |
| 630 | footrest position sensor |
| 631 | touchdown sensor |
| 1100 | microcontroller |
| 1102 | cpu |
| 1104 | clock |
| 1106 | board bus |
| 1108 | ram |
| 1110 | rom |
| 1112 | timer |
| 1114 | bus controller |
| 1116 | interface |
| 1118 | adc |
| 1120 | controller |

What is claimed is:

1. A passenger carrying apparatus usable with a vehicle, comprising:
   a seating surface;
   a moveable footrest below the seating surface, wherein the moveable footrest is moveable from an ingress/egress position and a transport position that is closer to the seating surface than the ingress/egress position;
   a footrest movement mechanism, wherein the footrest movement mechanism provides selective control of movement of the moveable footrest between the ingress/egress position and the transport position; and
   a passenger carrying apparatus frame including a mounting frame and first cross member connected to the mounting frame,
   wherein the footrest movement mechanism further includes a second cross member slideably supported by the mounting frame.

2. The passenger carrying apparatus of claim 1, wherein the footrest movement mechanism moves the moveable footrest between the ingress/egress position and the transport position.

3. The passenger carrying apparatus of claim 1, wherein the footrest movement mechanism is configured to bias the moveable footrest toward the transport position, wherein the footrest movement mechanism is configured to control movement of the moveable footrest from the transport position to the ingress/egress position when a downward force is applied to the moveable footrest to the ingress/egress position upon the downward force being removed from or decreased in relation to the moveable footrest.

4. The passenger carrying apparatus of claim 1, further comprising:
   a mounting interface for removably mounting the passenger carrying apparatus to the vehicle.

5. The passenger carrying apparatus of claim 1, wherein the footrest movement mechanism further includes
   a footrest activation mechanism mounted to the first cross member and the second cross member, wherein the footrest activation mechanism controls the movement of the moveable footrest between the ingress/egress position and the transport position.

6. The passenger carrying apparatus of claim 1, further comprising a mounting feature that is receivable at a mounting portion of the vehicle, whereby the passenger carrying apparatus is exchangeably mountable to the vehicle via the mounting feature.

7. The passenger carrying apparatus of claim 6, wherein the vehicle comprises a U-shaped portion having a first end and a second end at an open side of the U-shaped portion, wherein the mounting feature comprises a first mounting portion and a second mounting portion configured to be removably coupled to the first end and the second end of the U-shaped portion, wherein at least a portion of the moveable footrest is configured to fit within an opening defined by the open side of the U-shaped portion of the vehicle when the first mounting portion is coupled to the first end and the second mounting portion is coupled to the second end.

8. A vehicle with a passenger carrying apparatus, the passenger carrying apparatus, comprising:
   a seating surface;
   a moveable footrest below the seating surface, wherein the moveable footrest is moveable from an ingress/egress position and a transport position that is closer to the seating surface than the ingress/egress position;
   a footrest movement mechanism, wherein the footrest movement mechanism provides selective control of movement of the moveable footrest between the ingress/egress position the transport position; and
   a passenger carrying apparatus frame including a mounting frame and first cross member connected to the mounting frame, wherein the footrest movement mechanism further includes a second cross member slideably supported by the mounting frame.

9. The vehicle of claim 8, wherein the footrest movement mechanism moves the moveable footrest between the ingress/egress position and the transport position.

10. The vehicle of claim 8, wherein the footrest movement mechanism is configured to bias the moveable footrest toward the transport position, wherein the footrest movement mechanism is configured to control movement of the moveable footrest from the transport position to the ingress/egress position when a downward force is applied to the moveable footrest to the ingress/egress position upon the downward force being removed from or decreased in relation to the moveable footrest.

11. The vehicle of claim 8, further comprising:
a mounting interface for removably mounting the passenger carrying apparatus to the vehicle.

12. The vehicle of claim 8, wherein the footrest movement mechanism further includes
a footrest activation mechanism mounted to the first cross member and the second cross member, wherein the footrest activation mechanism controls the movement of the moveable footrest between the ingress/egress position and the transport position.

13. The vehicle of claim 11, wherein the passenger carrying apparatus further comprises a mounting feature for interchangeably mounting the passenger carrying apparatus to a frame of the vehicle.

14. The vehicle of claim 13, wherein the frame of the vehicle comprises a U-shaped portion having a first end and a second end at an open side of the U-shaped portion, wherein the mounting feature comprises a first mounting portion and a second mounting portion configured to be removably coupled to the first end and the second end of the U-shaped portion, wherein at least a portion of the moveable footrest is configured to fit within an opening defined by the open side of the U-shaped portion of the frame of the vehicle when the first mounting portion is coupled to the first end and the second mounting portion is coupled to the second end.

15. A passenger carrying apparatus usable with a vehicle, comprising:
a seating surface;
a mounting interface for removably mounting the passenger carrying apparatus to the vehicle;
a moveable footrest below the seating surface, wherein the moveable footrest is moveable from an ingress/egress position and a transport position that is closer to the seating surface than the ingress/egress position;
a footrest movement mechanism, wherein the footrest movement mechanism provides selective control of movement of the moveable footrest between the ingress/egress position the transport position; and
a passenger carrying apparatus frame including a mounting frame and first cross member connected to the mounting frame, wherein the footrest movement mechanism further includes a second cross member slideably supported by the mounting frame.

16. The passenger carrying apparatus of claim 15, wherein the footrest movement mechanism further includes
a footrest activation mechanism mounted to the first cross member and the second cross member, wherein the footrest activation mechanism controls the movement of the moveable footrest between the ingress/egress position and the transport position.

17. The passenger carrying apparatus of claim 15, wherein the footrest movement mechanism moves the moveable footrest between the ingress/egress position and the transport position.

18. The passenger carrying apparatus of claim 15, wherein the footrest movement mechanism is configured to bias the moveable footrest toward the transport position, wherein the footrest movement mechanism is configured to control movement of the moveable footrest from the transport position to the ingress/egress position when a downward force is applied to the moveable footrest to the ingress/egress position upon the downward force being removed from or decreased in relation to the moveable footrest.

19. The passenger carrying apparatus of claim 15, wherein a frame of the vehicle comprises a U-shaped portion having a first end and a second end at an open side of the U-shaped portion, and further comprising a mounting feature including a first mounting portion and a second mounting portion configured to be removably coupled to the first end and the second end of the U-shaped portion, wherein at least a portion of the moveable footrest is configured to fit within an opening defined by the open side of the U-shaped portion of the frame of the vehicle when the first mounting portion is coupled to the first end and the second mounting portion is coupled to the second end.

* * * * *